April 19, 1960  J. S. FOSTER, JR  2,933,611

NEUTRON SOURCE

Filed Sept. 6, 1955  2 Sheets-Sheet 1

INVENTOR.
JOHN S. FOSTER, Jr.

BY

Roland A. Anderson

ATTORNEY.

INVENTOR.
JOHN S. FOSTER, Jr.
BY
*Roland A. Anderson*
ATTORNEY.

United States Patent Office 2,933,611
Patented Apr. 19, 1960

2,933,611

NEUTRON SOURCE

John S. Foster, Jr., Livermore, Calif., assignor to the United States of America as represented by the United States Atomic Energy Commission Application September 6, 1955, Serial No. 532,809

13 Claims. (Cl. 250—84.5)

This invention relates to apparatus wherein nuclear reactions may be induced by means of accelerated charged particles and, more particularly, to source apparatus wherein such reactions are employed to produce neutrons.

In conventional practice, large quantities of neutrons are produced by massive apparatus such as various particle accelerators and nuclear reactors. Small constant fluxes of neutrons can be obtained from radium-beryllium, polonium-beryllium or photoneutron sources. However, it is often necessary to produce neutrons in copious quantities under conditions wherein it is highly disadvantageous to employ either the massive conventional apparatus or the more compart but very expensive and heavy radioactive sources. Moreover, the radioactivity which is continuously present with the latter is both hazardous and renders such a source unsuitable for many applications.

The present invention provides an exceedingly compact apparatus wherein nuclear reactions may be induced by utilizing accelerated charged particles including certain reactions which are productive of neutrons in copious yields. In essence the charged particles are accelerated by a procedure in which a gaseous substance containing the elemental particle to be employed is ionized by an electrical discharge, and the resulting charged particle is confined magnetically as a plasma in a well-defined region. Subsequently, a large pulsed electrostatic potential is applied to said plasma to extract the charged particle and to accelerate the same to an energy which is effective in inducing such nuclear reactions. Finally, the accelerated particle is caused to impinge upon a target material with which it is desired to induce the said reaction. Large neutron outputs can be obtained with low power consumption as well as other significant advantages.

Several reactions of the heavier hydrogen isotopes, i.e., deuterium and tritium (D and T, respectively), occur when ions of such isotopes are caused to impinge upon targets including either these materials or certain other light elements with sufficient energy imparted by a correlatively high pulsed electrostatic potential. Reactions between the hydrogen isotopes, noted below, are preferred since less accelerating energy and more copious yields are obtained therewith; however, other hydrogen isotope induced reactions, including those shown below, may also be employed.

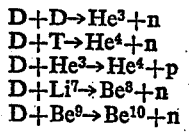

It is therefore an object of the present invention to provide methods and apparatus for inducing reactions with charged particles.

Another object of the invention is to provide methods and apparatus for inducing reactions with accelerated ions.

An additional object of the invention is to provide an economical compact apparatus for inducing reactions with charged particles.

One other object of the invention is to provide apparatus wherein a magnetic field is employed to confine a plasma produced by an electrical discharge into a defined region wherefrom ions or other elementary charged particles are extracted and accelerated for the purpose of inducing nuclear reactions.

Another object of the invention is to provide an apparatus utilizing a pulsed electrostatic potential to extract and accelerate ions from a plasma provided in a magnetically defined region to impinge on a target material wherein a nuclear reaction is induced.

An important object of the invention is to provide a neutron source wherein ions, formed of a light element, are extracted from a plasma produced by an electrical discharge and confined magnetically to a defined region, and are accelerated to impinge upon a light element target to produce neutrons by a nuclear reaction.

A further object of the invention is to provide a neutron source having a low power consumption and capable of producing an intense pulsed neutron output.

A still further object of the invention is to provide a method of producing intense bursts of neutrons.

The invention, both as to its organization and method of operation, together with further objects and advantages thereof, will best be understood by reference to the following specification taken in conjunction with the accompanying drawings, of which Figure 1 is a longitudinal cross sectional view of a preferred embodiment of the invention;

In the specification, the invention will be described, by example only, as embodied in a neutron source utilizing the hydrogen isotope deuterium in both the gaseous material and target material. Briefly, therefore, such a neutron source, constructed in accordance with the invention includes vacuum system means adapted to provide a housed, low pressure region, i.e., and at least partially evacuated space, and gas supply means arranged for the introduction of a gas comprising a hydrogen isotope, e.g., deuterium, into said low pressure region. Means providing an electrical discharge through said region is employed to ionize such gas for yielding a plasma, i.e., a space charge neutralized deuteron gas, which plasma is confined to a magnetically defined zone therein by a magnetic field applied by electrically energized solenoid means. At intervals a pulsed electrostatic potential is applied between said plasma and a deuterized target material, spaced apart in said low pressure region from said magnetically defined zone, resulting in the extraction and acceleration of deuterons from the plasma zone to impinge upon the target causing nuclear reactions which yield neutrons. Other ions may be produced by introducing an appropriate gas into said low pressure region and the ions thereof likewise caused to impinge upon a target which may include a material with which such other ions may thereby be caused to react as previously described.

Figure 1:
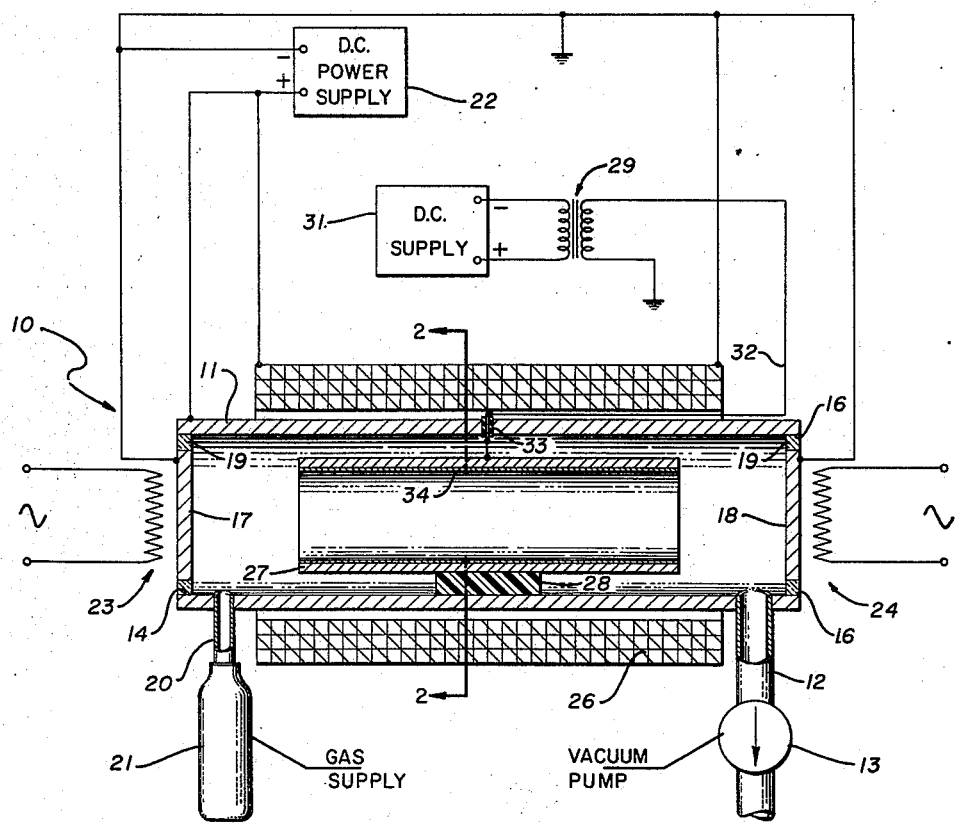
Figure 2:
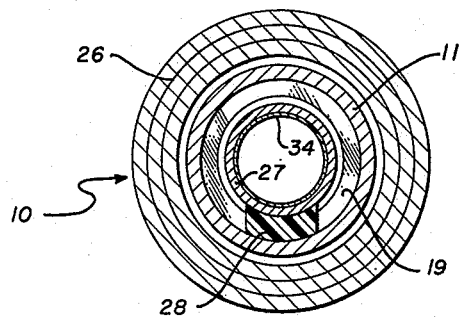
Figure 2 is a cross section taken along the plane 2—2 of Figure 1.

Referring now to the drawings, and Figures 1 and 2 in particular, the low pressure region of previous mention preferably is provided in an enclosure indicated generally at 10 and including a tubular cylindrical member 11 coupled at one end by a conduit tube 12 to a conventional vacuum pump 13. The open ends 14 and 16 of the member 11 are hermetically sealed by closure discs 17 and 18 supported peripherally and insulated from member 11 as by fused vitreous rings 19, disposed therebetween. Closure discs 17 and 18 are constructed of electron emissive material such as tungsten or an electron emissive oxide coated metal, while member 11 is of an electrical conducting material which is also pervious to a magnetic field, such as stainless steel, for reasons that will become apparent hereinafter.

Gaseous material is supplied to the now closed cylindrical member 11 (enclosure 10) by means of a conduit tube 20 entering one wall thereof and connecting with an external gas supply 21. A gaseous material may be admitted to the low pressure region as just described; the continuous regulated flow of gas through the enclosure 10 is established by the cooperative action of the gas supply 21 and the exhaust action of the vacuum pump 13 to provide the required reduced interior gas pressure.

The means for establishing an electrical discharge through the gaseous material in the illustrated embodiment comprises a D.C. power supply 22 which is arranged to apply an electrical potential between the member 11 and the electron emissive discs 17 and 18. In practice this is accomplished by connecting the positive terminal of the power supply 22 to the cylindrical member 11, which then serves as an anode, and connecting the negative terminal to a common ground circuit and to both the closure discs 17 and 18 which then serve as electron emitting cathodes between which the electrical discharge occurs. The cathodes 17 and 18 may be indirectly heated by filaments 23 and 24 arranged respectively adjacent thereto and energized by an A.C. current source (not shown) to increase the emission of electrons therefrom and facilitate establishment of the discharge.

For restraining the arc discharge to a defined region, an axially symmetric magnetic field is established by a solenoid 26 disposed coaxially about cylindrical member 11 and energized by power supply 22. With the foregoing construction and arrangement it will be found that electrons will be emitted from each of the closure discs 17 and 18 serving as cathodes and accelerated by the member 11 toward the opposing cathode substantially along the longitudinal axis of the enclosure 10 and from which they are repelled and then accelerated in the opposite direction. Thus the electrons oscillate between the cathodes 17 and 18 through the gaseous material establishing an arc discharge which ionizes the gaseous material and produces a substantially space charge neutralized plasma. It will be seen, therefore, that a constrained arc column or plasma of the desired ions is established in a generally cylindrically defined zone disposed substantially coaxially within the enclosure 10.

Means for applying the high potential required for the extraction and acceleration of such ions out of the aforesaid plasma zone may be provided by means of a tubular electrode 27, constructed of a conductor material which is pervious to said magnetic field, e.g., copper, which is disposed coaxially within the member 11 so as to substantially encompass said zone and fixed therein by an insulating spacer support 28 disposed in the annular space between the member 11 and electrode 27.

Several equivalent conventional means may be employed to generate the required high accelerating potential such as high voltage D.C. supplies, transformers and pulsed supplies such as pulse generating lines and pulse transformer circuits dependent on the type of operation desired. In intermittent or pulsed operation such high potential may be advantageously supplied by a pulse transformer 29 which is energized by a D.C. supply 31 adapted for discharge through the primary thereof. Such a supply will include a D.C. generating circuit, storage capacitors and switching means, e.g., ignitrons of conventional types to accomplish this purpose. Likewise, circuits responsive to external synchronizing signals may be employed to synchronize operation with apparatus with which the neutron source is employed. One terminal of the secondary of the transformer 29 is connected to a common ground circuit and the other terminal is attached to electrode 27 as by means of an insulated conductor 32 which is led through an appropriate vacuum seal 33 in the tubular wall of member 11. Thus, the electrode 27 is held at a floating ground potential until the D.C. supply 31 is actuated and thereby no charge can accumulate thereon so as to disturb the arc plasma which passes therethrough. Actuation of the D.C. supply to energize the transformer applies a high negative potential to the electrode 27, relative to cathode closure discs 17 and 18 and the constrained plasma, effectively extracting and accelerating deuterons towards the inner surface of electrode 27. It will be appreciated that the electrode 27 may have any shape such as a flat disc or the like and thus it is not intended to limit the invention to having an electrode with a tubular configuration, although it is obvious that the tubular electrode, having a greater surface area and more favorable geometry than electrodes constructed of discs and the like, will be capable of extracting a larger number of ions from the arc column confined by an axially symmetric magnetic field and thus is preferred for large outputs. However, with other types of magnetic fields providing non-cylindrical confinement zones, e.g., rectangular or ribbonlike, different electrode configurations will provide maximum yields as hereinafter described.

A target material 34, in which neutron producing reactions with ions of the gaseous material are to be induced, is disposed on the interior surface of, or occluded in the material of the electrode 27 such that ions accelerated towards the electrode will impinge thereon and produce bursts of neutrons each time the high negative potential is applied to the electrode 27. Metals of the transition group, such at titanium, tantalum, palladium, zirconium, etc., which are characterized by their ability to occlude large amounts of gas, may be utilized to construct the electrode 27 for occluding target materials, such as hydrogen isotopes used in D—D and T—D reactions for the production of neutrons. To saturate the electrode 27 constructed of one of the transition group metals, the electrode is outgassed at several hundred degrees centigrade (red heat) in an evacuated system and then the gas, e.g., deuterium or tritium, to be occluded is admitted at atmospheric pressure to contact the heated metal. The metal is then allowed to cool slowly for approximately one hour during which time the metal absorbs large amounts of the gas. The gas occluded or absorbed by the cooled metal will be retained even in the very highest vacuums until such time as energized ions, e.g., deuterons or tritons, impinge thereon causing the release of neutrons therefrom. Titanium is a metal preferred for this purpose since it is capable of retaining very large amounts of the gas and possesses other requisite properties to a highly satisfactory degree. Moreover, under some conditions of continued use a considerable amount of the gas, which is present in the enclosure 10, will eventually adsorb on a target electrode constructed of the indicated metals. Other target materials may be applied as glazes or fused layers to the target surface.

Considering now the operation of the neutron source of the invention utilizing an axially symmetric magnetic field, it should be noted that the D.C. power supply 22 provides an electrical potential between the member 11 and the heated cathodes 17 and 18 thereby establishing an oscillating electron discharge between the cathodes. Thus when gas in introduced from the supply 21 into the enclosure 10, the gas will be ionized by the electron discharge thereby providing an arc discharge which is restrained to a defined arc column or plasma zone upon application of the axially symmetric magnetic field provided by the solenoid 26. It will be noted that each time the electrode 27 is pulsed with a high negative voltage, ions in the arc column will be extracted and accelerated towards the target electrode and impinge upon the target material 34 reacting therewith and producing a burst of neutrons.

Figure 3:
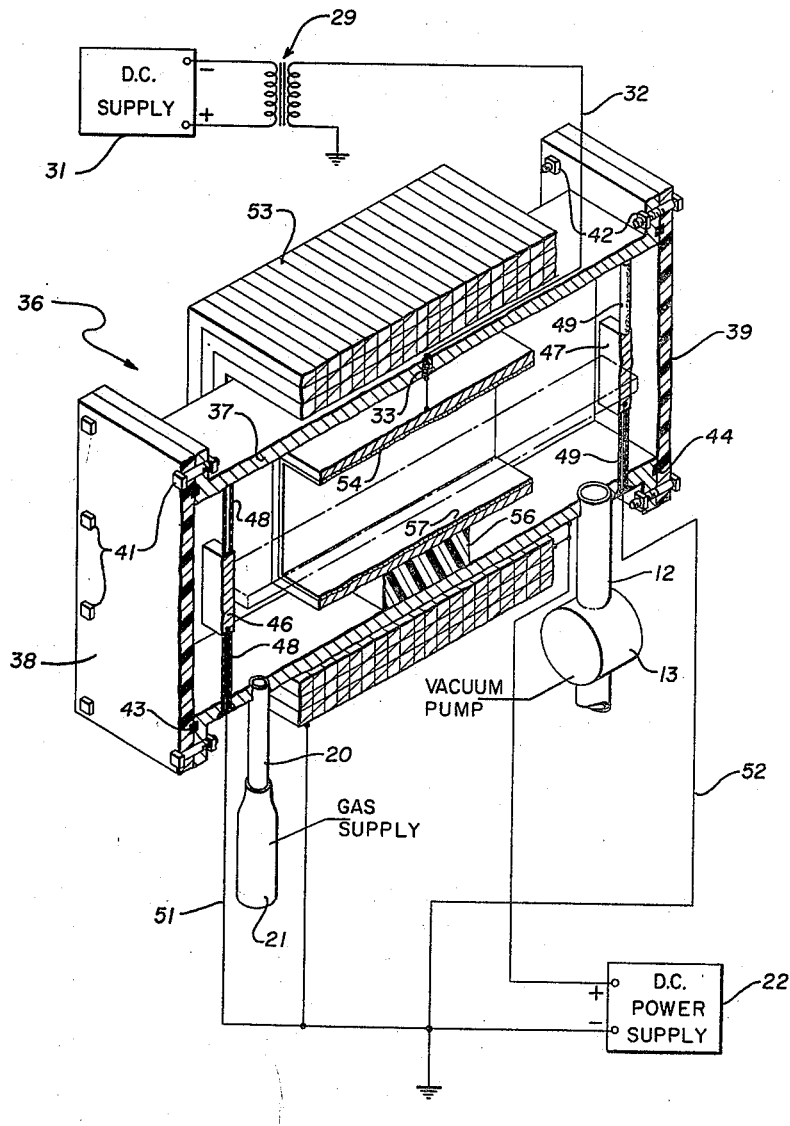
Figure 3 is a perspective view partially in section of a second preferred embodiment of the invention.

An alternate embodiment of the invention is illustrated in Figure 3 and is characterized by rectangular shaped elements to furnish a magnetic field configuration that will provide a ribbonlike, i.e., substantially rectangular, plasma confinement zone to effect maximum utilization of the plasma generated. This arrangement is particularly advantageous since a plasma exhibits a maximum depth of penetration from which ions can be extracted and thus ideally a ribbon-shaped plasma having a thickness approximately twice the depth of penetration will enable the attainment of a maximum ratio of ions extracted relative to plasma volume with appropriate extracting electrodes.

As shown in Figure 3, the low pressure region of the alternate embodiment is provided in an enclosure, indicated generally at 36, and including a flanged hollow rectangular member 37 coupled by the conduit 12 to the external vacuum pump 13. The member 37 will also function as an anode when the positive terminal of the D.C. power supply 22 is connected thereto, and accordingly should be constructed of electrical conducting material which is also pervious to a magnetic field, such as stainless steel or the like. The flanged extremities of the member 37 are hermetically sealed by end closure plates 38 and 39 constructed of insulating material secured by means of bolts 41 and 42 extending through interposed sealing elements 43 and 44.

Gaseous material may be supplied to the enclosure 36 by the conduit 20 entering one wall thereof and communicating with the external gas supply 21.

Two rectangular electron emissive cathodes 46 and 47 are disposed in longitudinally spaced relationship within the enclosure 36, equidistant from the surfaces of the member 37, as by means of pairs of insulating rods 48 and 49, respectively, secured to opposing walls of member 37. The lower rods 48 and 49 may take the form of tubes arranged to pass through the wall of the member 37 and fused to the exterior surface thereof providing an air tight seal for the purpose of connecting the negative terminals of the D.C. power supply 22 to cathodes 46 and 47 as by means of insulated conductors 51 and 52 led therethrough. Thus an arc discharge is established through the gaseous material by the electrical potential provided between the member 37, serving as an anode, and the cathodes 46 and 47. Indirect heating could, of course, be applied to said cathodes to facilitate establishment of the arc.

For restraining the arc discharge to a defined ribbonlike region, an appropriate magnetic field is established with a rectangular solenoid 53 disposed about the member 37 and energized by the D.C. power supply 22. With the foregoing construction, electrons will be emitted from each of the rectangular cathodes 46 and 47 and accelerated by the anode 37 toward the opposing cathode substantially along the longitudinal axis of the enclosure 36 from which they are repelled and thereafter accelerated in the opposite direction. Thus the energized electrons oscillate between the cathodes through the gaseous material establishing an arc discharge which ionizes the gaseous material and produces a substantially space charge neutralized plasma, which plasma is collimated to a thin ribbon or generally rectangular elongated volume by the applied magnetic field. As contrasted with the axially symmetric magnetic field in the first described embodiment, the magnetic field now employed may generally be characterized as symmetrical about a linear plane surface and therefore may be produced by solenoids having rectangular, square or elliptical cross sections.

Means for applying the high potential required for the extraction and acceleration of such ions out of the aforesaid thin ribbon plasma zone may be provided by disposing a hollow rectangular electrode 54, constructed of a conductor material which is pervious to a magnetic field, e.g., copper, in spaced relationship within the member 37 and so as to encompass said ribbon plasma zone. The electrode 54 may be supported within the enclosure 36 and insulated from the anode 37 by an insulating spacer 56 disposed therebetween. The electrode 54 is coupled to the secondary of the pulse transformer 29 which provides a high negative potential thereto for extracting and accelerating ions out of the plasma zone. It will be appreciated that the electrode 54 is not necessarily of a solid rectangular shape, but may comprise separate flat plates or even a single plate in the instance that the thickness of plasma strip is approximately equal to one depth of penetration. It is intended to point out the ideal electrode configuration for the particular plasma configuration generated, and thus a combination of an electrode structure most nearly approximating the shape of the plasma generated and proper selection of electrical components with reference to the arc discharge, magnetic field generated, and extracting potentials, will enable the ideal plasma configuration and the extraction of the maximum number of ions. A target material 57 in which nuclear reactions with said ions is to take place, is disposed on, or occluded in the interior surface of the electrode 54.

Considering now briefly the operation of the neutron source of the invention utilizing a rectangular magnetic field configuration, it should be noted that the D.C. power supply 22 provides an electrical potential between member 37 and cathodes 46 and 47 thereby establishing an oscillating electron discharge between the cathodes. Thus when gas is introduced from the supply 21 into the enclosure 36, the gas will be ionized by the electron discharge thereby providing an arc discharge which is restrained to a rectangularly defined arc column or ribbonlike plasma zone upon application of the magnetic field provided by the rectangular solenoid 53. Thus each time electrode 54 is pulsed with a high negative voltage, ions in the plasma will be extracted and accelerated to impinge upon the target material 57 reacting therewith such that a burst of neutrons is produced.

It will be appreciated that the selection of the gaseous material will depend on the character of the matter, i.e., target material, with which reactions by the accelerated ions are to be induced. For example, deuterium may be utilized in the reaction $[D+D \rightarrow He^3+n]$ or tritium may be utilized in the reaction $[T+D \rightarrow He^4+n]$ to obtain neutrons by the use of extracting and accelerating potentials ranging upwards from a few thousands of volts. The other reactions proceed with potentials in excess of about 10 kilovolts and upwards to hundreds of kilovolts dependent on the known threshold energy of the reaction. The maximum gas pressure which may be employed in the enclosures 10 and 36 will depend on the accelerating potential since the accelerating potential which can be established between the plasma zone and the target electrode will depend on the spacing therebetween and to a certain extent upon the density of gas matter disposed therebetween. Pressures of below about $10^{-3}$ to $10^{-4}$ mm. Hg are generally employed.

It is to be noted that the invention is useful for producing particles other than neutrons. By inducing the reaction $[He^3+D \rightarrow He^4+p]$ protons may be produced and utilized in said enclosures. Other similar reactions for which a device of this nature may be utilized are well known in the art. Various products likewise may be formed, in situ, in the target in a manner similar to conventional accelerator practice. Thus the present invention provides a very compact, high intensity output pulsed neutron or other energetic particle source as well as additional means for conducting various types of nuclear reactions. Since many gaseous materials may be introduced into the plasma zone it will be apparent that a large variety of accelerated ions can be produced in the apparatus. When the invention is utilized as a pulsed source of neutrons it provides an intense yield of neutrons ranging upwards from $10^5$ to $10^6$ neutrons per pulse which can be used for a variety of applications such as initiating fission, combining with matter to form useful isotopes and the like.

The neutron source of the invention utilizing an axially symmetric magnetic field has produced $10^6$ D—D neutrons by the reaction [D+D→n+$He^3$+3.25 mev.] in $2 \times 10^{-8}$ seconds with an instantaneous current of approximately 12 amperes at −200 kv. delivered to the target-electrode to accelerate the deutrons to 200 kv. before striking a deuterium target. In this instance the target-electrode consisted of a deuterium loaded titanium disc approximately three square inches in area which was disposed within the enclosure 10 approximately one inch from the edge of the cylindrical plasma column.

While the invention has been disclosed with respect to but two preferred embodiments, it will be apparent to those skilled in the art that numerous variations and modifications may be made within the spirit and scope of the invention and thus it is not intended to limit the invention except as defined in the following claims.

What is claimed is:

1. An apparatus for inducing reactions with ionized elemental material comprising in combination an elongated evacuated enclosure, electron emissive surfaces spaced longitudinally within said enclosure, means for introducing a gaseous form of said material into said enclosure, electrical current supply means for providing a voltage between said enclosure serving as an anode and said cathodes for causing electrons to be emitted from said cathodes and thereby establishing an electrical discharge through said gas to ionize gas molecules therein, means including a solenoid arranged about said enclosure for applying an axially symmetric magnetic field for confining said ionized gas to a defined plasma zone, a tubular target incorporating a material to be reacted with said elemental material arranged coaxially within said enclosure in spaced relationship with said plasma zone, and means for applying a negative electrostatic field to said target for extracting and accelerating ions from said plasma zone into impingement upon and reaction with said target.

2. An apparatus for inducing reactions with ionized elemental material comprising in combination a cylindrical anode, electron emissive cathode elements disposed coaxially at the ends and spaced from said anode, insulating elements disposed between and hermetically secured to said cathodes and said anode defining therewith an evacuable enclosure, means for supplying a gaseous form of said elemental material to said enclosure, a D.C. power supply providing a voltage between said anode and said cathodes for causing electrons to be emitted by said cathodes and thereby establishing an electrical discharge through said gas to ionize gas molecules therein, a D.C. energized solenoid arranged about said anode for establishing an axially symmetric magnetic field in said enclosure and thereby confining said ionized gas to a defined plasma zone, a target electrode incorporating a material to be reacted with said ionized elemental material and arranged within said enclosure in a spaced enveloping relationship with said defined plasma zone, and an electrical pulse generator for applying a pulse of high negative voltage to said target electrode relative to said cathodes for extracting and accelerating ions from said plasma zone to impingement and reaction with said material.

3. A neutron source comprising in combination a cylindrical anode and formed of electrical conducting material pervious to a magnetic field, cathode elements of electron emissive material disposed coaxially at the ends and spaced from said anode, insulating elements disposed between and hermetically secured to said cathodes and said anode defining therewith an evacuable enclosure, means for providing a continuous supply of hydrogen gas to said enclosure, a D.C. power supply for providing a continuous voltage between said anode and said cathodes for causing electron emission from said cathodes and thereby establishing an electrical discharge therethrough to ionize said gas, a solenoid disposed coaxially about said anode for providing an axially symmetric magnetic field therein and thereby confining said ionized gas to a cylindrical plasma zone, a target electrode constructed of conducting material pervious to a magnetic field and disposed within said anode and spaced from said plasma zone, an electrical pulse generator for applying a pulse of high negative voltage to said target electrode for attracting ions thereto from said electrical discharge, and a material which is capable of yielding neutrons upon impingement by said extracted ions and disposed on the surface of said electrode proximal said plasma zone.

4. A neutron source comprising in combination a cylindrical anode having open ends and formed of electrical conducting material pervious to a magnetic field, cathode discs of electron emissive material disposed at said ends coaxially with and spaced from said anode, annular insulating elements disposed between and hermetically secured to said cathodes and said anode defining therewith an evacuable enclosure, an external vacuum pumping means for evacuating said enclosure, electrical heating elements arranged for heating said cathodes for facilitating electron emission therefrom, an external hydrogen isotope gas supply, a tube connecting with said gas supply and entering said enclosure for admitting gas therein and thereby providing a continuous regulated hydrogen isotope gas pressure in said enclosure by the cooperate action of said gas supply and said vacuum pumping means, a D.C. power supply for providing a continuous voltage between said anode and said heated cathodes for causing electron emission therefrom and thereby establishing an electrical ionized gaseous discharge through said enclosure, a solenoid disposed coaxially about said anode for providing an axially symmetric magnetic field therein and thereby confining said gaseous discharge to a cylindrical plasma zone along the longitudinal axis of said enclosure, a tubular electrode pervious to a magnetic field arranged within said enclosure coaxially about and spaced from said gaseous discharge, an electrical pulse generator for applying a pulsed high negative voltage through a transformer to said tubular electrode for extracting and accelerating hydrogen isotope ions from said gaseous discharge, and a target material capable of emitting neutrons when bombarded by said accelerated ions and disposed on the surface of said electrode proximal said plasma zone.

5. A neutron source as described in claim 4 wherein said target material comprises a hydrogen isotope occluded in said electrode.

6. An apparatus for inducing reactions with ionized elemental material comprising in combination an elongated evacuated enclosure having at least a circumferentially disposed conductive area, means for supplying a gaseous form of said elemental material in said enclosure, electron emissive cathodes having electron emissive surfaces disposed in said enclosure and spaced from said conductive area, electrical means for applying an electrical potential between said conductive enclosure area serving as an anode and said cathodes establishing an electron discharge therebetween to ionize said elemental material, means for establishing a magnetic field for confining said ionized material to a defined ribbon-like plasma zone through said enclosure between said cathodes, a target incorporating a material to react with said ionized material and disposed within said enclosure in radially spaced relationship with said plasma zone, and means for applying an electrostatic potential to said target for extracting and accelerating ions from said plasma zone to impingement upon said target and reaction with said target material.

7. Apparatus as described in claim 6 wherein said means for establishing a magnetic field comprises a magnet winding having a hollow rectangular cross-section and energized from a direct current power source for establishing a magnetic field through said enclosure that is symmetrical about a plane through the axis of the enclosure.

8. An apparatus for inducing reactions with ionized elemental material comprising in combination an elongated electrical conducting member of cylindrical configuration, insulating plates hermetically secured to ends of said member and forming therewith an evacuable enclosure, means for introducing a gaseous form of said material into said enclosure, electron emissive cathode elements disposed in insulated longitudinally spaced relationship within said enclosure, electrical means for impressing a voltage between said member serving as an anode and said cathodes for causing electron emission from said cathodes and thereby establishing an electrical discharge through said gas to ionize gas molecules therein, solenoid means for applying a magnetic field having symmetry about a longitudinal plane in said member for restraining said ionized gas to a defined ribbonlike plasma zone along said plane between said cathodes, a tubular target incorporating a material to be reacted with said elemental material and disposed within said enclosure spaced from said plasma zone, and means for applying an electrostatic field to said target for extracting and accelerating ions from said plasma zone to impingement on said target and reaction with said target material.

9. An apparatus for inducing reactions with ionized elemental material comprising in combination an evacuated enclosure having at least a radial conductive portion, means for supplying a gaseous form of said elemental material to said enclosure, rectangular electron emissive cathode elements coaxially disposed in insulated, longitudinally spaced relationship within said enclosure, a D.C. power supply for providing a voltage between said conductive portion and said cathodes for causing electron emission from said cathodes and thereby establishing an electrical discharge therethrough to ionize said elemental material, a solenoid disposed radially about said enclosure for providing a magnetic field having symmetry about a longitudinal plane in said enclosure and confining said ionized gas to a ribbonlike plasma zone along said plane, a target electrode incorporating a material to be reacted with said ionized elemental material and disposed within said enclosure in spaced enveloping relationship with said ribbonlike plasma zone, and an electrical pulse generator for applying a pulse of high negative voltage to said target electrode relative to said cathodes for extracting and accelerating ions from said plasma zone to impingement on said target electrode and reaction therewith.

10. A neutron source comprising in combination an evacuated enclosure including at least a radial anode portion, means for providing a continuous supply of hydrogen gas to said enclosure, rectangular electron emissive cathode elements coaxially disposed in insulated longitudinally spaced relationship within said enclosure, a D.C. power supply for providing a continuous voltage between said anode portion and said cathodes for causing electron emission from said cathodes and thereby establishing an electrical discharge therethrough to ionize said gas, a D.C. energized solenoid disposed radially about said anode portion for providing a magnetic field having symmetry about a longitudinal plane in said enclosure and thereby confining said ionized gas to a ribbonlike plasma zone along said plane, a target electrode which is pervious to a magnetic field and arranged within said enclosure in spaced enveloping relationship with said ribbonlike plasma zone, an electrical pulse generator for applying a pulse of high negative voltage to said target electrode to attract ions thereto from said plasma zone, and a material which is capable of yielding neutrons on impingement by said extracted ions disposed on the surface of said electrode proximal said plasma zone.

11. A neutron source comprising in combination a rectangular anode having open ends and formed of electrical conducting material pervious to a magnetic field, rectangular insulating plates hermetically secured to said anode closing said ends and forming therewith an evacuable enclosure, vacuum pumping means for evacuating said enclosure, an external hydrogen isotope gas supply, a conduit connecting with said gas supply and entering said enclosure for admitting gas therein and therefore providing a continuous regulated hydrogen isotope gas pressure in said enclosure by the cooperate action of said gas supply and said vacuum pumping means, rectangular electron emissive cathode elements coaxially disposed in insulated longitudinally spaced relationship within said enclosure along the longitudinal axis thereof, a D.C. power supply for providing a continuous voltage between said anode and said cathodes for causing electron emission therefrom and thereby establishing an electrically ionized gaseous discharge through said enclosure, a rectangular solenoid disposed coaxially about said anode for providing therein a magnetic field having symmetry about a longitudinal plane in said anode for confining said gaseous discharge to a ribbonlike plasma zone along the longitudinal axis of said anode, a hollow rectangular and magnetically permeable electrode arranged within said enclosure in spaced relationship coaxially about a portion of said plasma zone, a pulse excited transformer for applying a pulse of high negative voltage to said electrode for extracting and accelerating hydrogen isotope ions from said plasma zone, and a target material capable of emitting neutrons when bombarded by said accelerated ions disposed on the surfaces of said electrode proximal said plasma zone.

12. A neutron source as described in claim 11 wherein said target material comprises a hydrogen isotope occluded in said electrode.

13. A neutron source comprising a hollow elongated anode, means including a solenoid disposed about said anode for establishing a magnetic field longitudinally through said anode, a pair of electrodes maintained at a negative potential with respect to said anode disposed at the ends of said anode for establishing a discharge therethrough, gas inlet means introducing a gas to be ionized into said anode whereby there is established a plasma column through said anode, a target material disposed within said anode about said plasma column for producing neutrons by bombardment with ions of the gas introduced into said anode, and means intermittently applying a large negative potential to said target material whereby ions of said plasma are highly accelerated radially outward of the plasma to impinge upon said target material for producing neutrons.

References Cited in the file of this patent
UNITED STATES PATENTS

| | | |
|---|---|---|
| 2,211,668 | Penning | Aug. 13, 1940 |
| 2,240,914 | Schutze | May 6, 1941 |
| 2,489,436 | Salisbury | Nov. 29, 1949 |
| 2,499,289 | Backus | Feb. 28, 1950 |
| 2,636,990 | Gow et al. | Apr. 28, 1953 |
| 2,689,918 | Youmans | Sept. 21, 1954 |
| 2,735,019 | Dewan et al. | Feb. 14, 1956 |
| 2,769,096 | Frey | Oct. 30, 1956 |